(12) United States Patent
Price

(10) Patent No.: US 10,639,931 B2
(45) Date of Patent: May 5, 2020

(54) SECURE LOCKING HUB SYSTEM

(71) Applicant: Adam Price, Springfield, OH (US)

(72) Inventor: Adam Price, Springfield, OH (US)

( * ) Notice: Subject to any disclaimer, the term of this patent is extended or adjusted under 35 U.S.C. 154(b) by 50 days.

(21) Appl. No.: 15/977,954

(22) Filed: May 11, 2018

(65) Prior Publication Data

US 2019/0344619 A1 Nov. 14, 2019

(51) Int. Cl.
| | |
|---|---|
| *B60B 27/02* | (2006.01) |
| *B60B 27/06* | (2006.01) |
| *B60B 7/16* | (2006.01) |
| *B60B 3/16* | (2006.01) |

(52) U.S. Cl.
CPC .............. *B60B 27/065* (2013.01); *B60B 3/16* (2013.01); *B60B 7/16* (2013.01)

(58) Field of Classification Search
CPC .......... B60R 25/09; B60B 7/16; B60B 27/02; B60B 27/065; B60B 3/16; B60B 25/09; B62D 63/08; F16D 1/10; F16D 2001/103
USPC .... 70/225, 226, 237; 301/105.1, 35.58, 111, 301/114
See application file for complete search history.

(56) References Cited

U.S. PATENT DOCUMENTS

| | | | |
|---|---|---|---|
| 5,520,272 A | 5/1996 | Ewer | |
| 5,908,080 A * | 6/1999 | Bigley | ............... B60K 17/3515 180/247 |
| 5,941,105 A | 8/1999 | Macey | |
| 7,891,743 B2 | 2/2011 | Ballard | |
| 2013/0011215 A1 | 1/2013 | Wells | |

OTHER PUBLICATIONS

U.S. Appl. No. 15/663,450, filed Jul. 28, 2017, Adam Price.
U.S. Appl. No. 15/902,448, filed Feb. 22, 2018, Adam Price.
Non-final Office Action dated Feb. 22, 2019 in U.S. Appl. No. 15/663,450.

* cited by examiner

*Primary Examiner* — Suzanne L Barrett
(74) *Attorney, Agent, or Firm* — AdamsIP, LLC; Stephen Thompson

(57) ABSTRACT

A secure locking hub system for locking a wheel hub of a vehicle in a rotationally fixed position relative to an axle is provided. The system has a locking ring that may be moved between locked and unlocked configurations. When in the locked configuration, the wheel hub will not rotate and the vehicle thus cannot be moved. The system additionally has a security lock that prevents any unauthorized individual from unlocking the wheel hub, thereby preventing theft of the vehicle. The system includes a fastener designed to allow the system to be retrofitted to an existing vehicle axle without requiring replacement or mechanical modification of the axle.

19 Claims, 11 Drawing Sheets

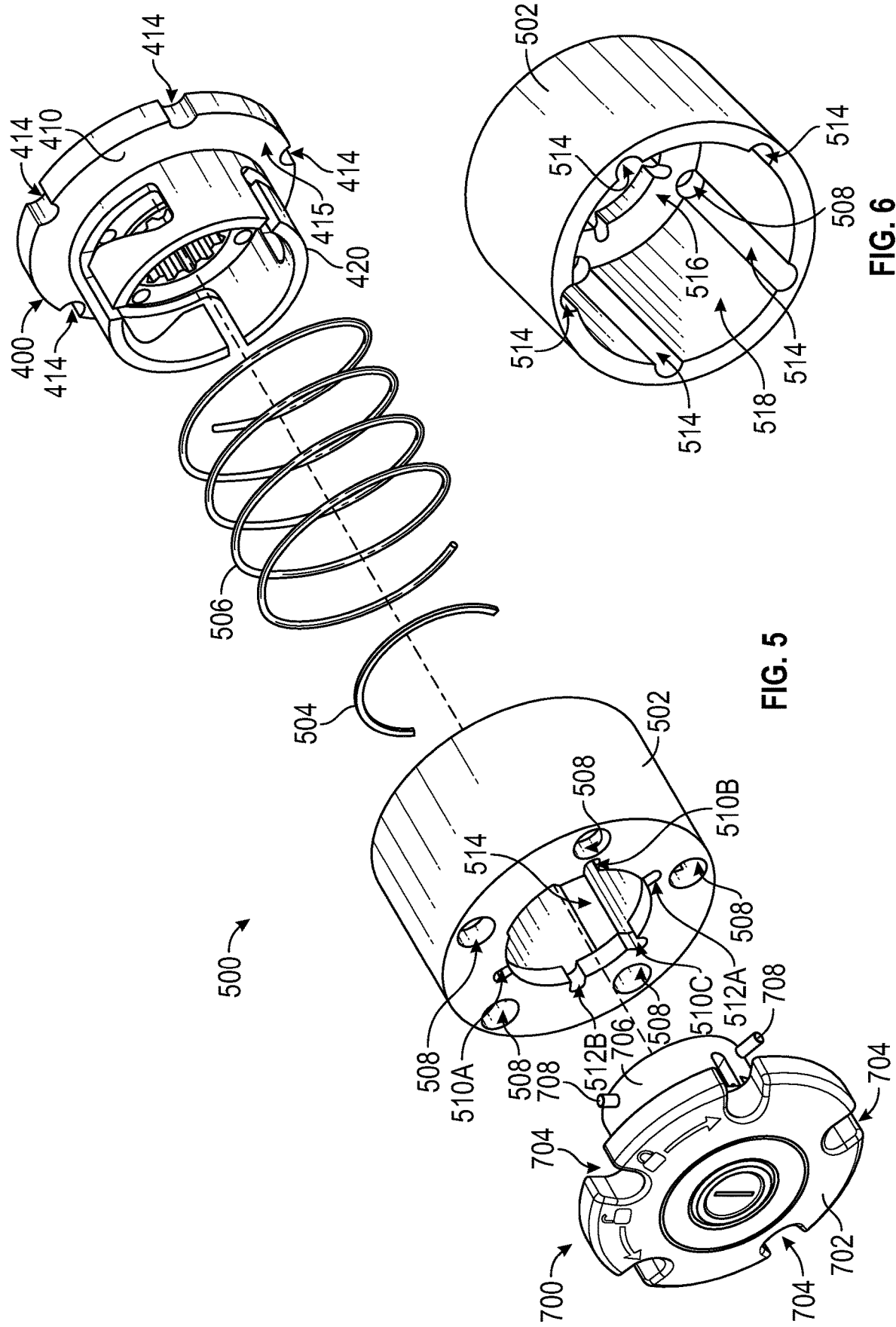

SECURE LOCKING HUB SYSTEM

FIELD OF THE INVENTION

The present invention relates generally to a secure locking hub system designed to prevent theft of a vehicle.

BACKGROUND

Trailers pulled by powered vehicles may be used to transport a variety of goods or materials, such as cargo, tools, equipment, vehicles, or livestock. Thus, many types of trailers have been designed for different purposes. These may include enclosed cargo trailers, flatbed trailers, boat trailers, vehicle trailers, livestock trailers, or dollies. Other types of trailers may be adapted to provide shelter, such as construction trailers or travel trailers. Trailers are typically attached to a powered vehicle using a hitch, which is used to tow the trailer behind the motorized vehicle from location to location. The trailer may be detached from the vehicle by removing the trailer from the hitch.

Trailers are often targets of theft due to the value of the trailer itself as well as the value of items that may be stored within the trailer. Hitch coupler locks are commonly used to prevent theft of trailers by securely latching a coupler onto a ball on the trailer hitch and locking the coupler into place. A coupler lock system locks a trailer to a vehicle hitch when the trailer is hitched to the vehicle and may also prevent an unhitched trailer from being hitched to a vehicle. However, hitch coupler lock systems generally use an exposed lock, such as a padlock, which may be cut by lock cutters or otherwise compromised in order to facilitate removing a hitched trailer from a vehicle and/or allowing an unhitched trailer to be hitched to a vehicle for the purpose of stealing the trailer. In addition, if the coupler or the latching mechanism of a coupler lock system fails, the locking system may be rendered inoperable. Further, coupler lock systems are used strictly for trailers having a coupler designed to be latched onto a ball hitch and thus cannot be used to prevent theft of a motorized vehicle, such as a car, motorcycle, recreational vehicle (RV), golf cart, electric conveyance vehicle (ECV), or similar types of vehicles.

Some attempts have been made to provide a security system for locking a vehicle wheel hub to prevent theft of the vehicle. For instance, in one system, an actuated locking ring locks and unlocks a wheel hub to an axle, and operation of the locking ring is controlled by a lock to prevent unauthorized unlocking of the wheel hub. One problem with such a system is that it requires a means of mechanically locking the wheel hub to the axle. However, axles installed on existing vehicles generally do not have such a mechanical locking means. Thus, although a wheel hub may be replaced using common tools, installation of such a system would additionally require replacement or mechanical modification of an existing vehicle axle to provide a locking means. Such modification or replacement of an existing axle is difficult, costly, and time consuming. Due to these drawbacks, it is unlikely that many consumers would themselves install such a system on an existing vehicle owned by the consumer. In addition, although manufacturers of vehicles and/or wheel hubs may be better equipped to produce an axle with such a mechanical locking means, it may be advantageous for such manufacturers to produce a secure locking hub system without the necessity of modifying the design of existing axles used in the production of vehicles.

Accordingly, a need exists in the art for a system for locking a vehicle wheel hub that may be retrofitted to an existing vehicle in order to prevent theft of the vehicle.

SUMMARY

In one aspect, a secure locking hub system for locking a wheel hub of a conveyance vehicle to an axle is provided. The system is designed to be retrofitted to an existing axle of an existing vehicle without requiring replacement or modification of the existing axle. The system includes a fastener configured to fasten a wheel hub to an existing axle and to provide an engagement surface to allow the hub to be rotationally locked to the fastener to prevent rotation of the wheel about the axle. The system also has security features designed to prevent unauthorized unlocking of the hub once the hub is locked in a rotationally fixed position relative to the axle. Securely locking the wheel hub (and thus the wheel secured to the hub) in a rotationally fixed position prevents theft of the vehicle by preventing the vehicle from being moved by an unauthorized person through normal operation of the vehicle. The locking hub system may be installed on an axle of a motorized or non-motorized vehicle and is preferably installed on an axle that is mounted on the vehicle in a rotationally fixed position. Multiple locking hub systems may be installed on one or more individual wheels of the vehicle, respectively, to provide greater security.

The system includes a hub that may be rotatably coupled to an existing vehicle axle with a wheel mounted on the hub. The system is designed to be switched between a locked configuration and an unlocked configuration. When in the locked configuration, the hub and the wheel mounted thereon will not rotate on the axle. With at least one wheel hub of a conveyance vehicle in a rotationally locked position relative to the axle, the vehicle cannot move through normal rotation of the wheel. When in the unlocked configuration, the hub and wheel mounted thereon may freely rotate so that the vehicle may be operated in a normal manner. A security lock secures the locking hub system in the locked configuration in order to prevent any unauthorized individual from switching the system into the unlocked configuration. Thus, the security lock prevents unauthorized movement of the vehicle and thus prevents theft.

The locking hub system comprises a wheel hub; a fastener configured to fasten the wheel hub to an existing vehicle axle such that the wheel hub is rotatably coupled to the axle, wherein the fastener has a plurality of splines; a locking ring configured to mate with the splines of the fastener in a locked configuration and to decouple from the splines in an unlocked configuration; an actuator operably connected to the locking ring and configured to move the locking ring in an axial direction between the locked configuration and the unlocked configuration; and a lock configured to selectively limit operation of the actuator. The wheel hub is locked in a rotationally fixed position in the locked configuration and free to rotate in the unlocked configuration. The locking ring moves back and forth in an axial direction to mate with the splines of the fastener and to decouple from the splines of the fastener.

In a preferred embodiment, the actuator is a mechanical actuator comprising a dial operably connected to the locking ring and configured to move the locking ring in an axial direction between the locked configuration and the unlocked configuration in response to rotational movement of the dial. In this embodiment, the lock is configured to selectively limit rotational movement of the dial. Thus, the dial may be locked in place when the locking ring is either in the locked configuration or the unlocked configuration. The dial may be unlocked to rotate the dial in order to switch the locking ring between the locked and unlocked configurations. The dial may be secured to a housing that is fastened to the hub with bolts, which preferably each have a tamper-proof bolt head. In a preferred embodiment, the dial is configured to cover the head of each bolt when the locking ring is in the locked configuration so that the bolts cannot be accessed from the exterior of the wheel hub when in the locked configuration. This feature prevents an unauthorized person from circumventing the security features of the locking hub system by disassembling the wheel hub. Thus, an unauthorized user not in possession of a key to the lock will not be able to unlock the hub and thus will be unable to move the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

FIG. 5 shows an exploded view of an actuator assembly for a locking hub system in accordance with the present disclosure.

FIG. 6 shows a perspective view of a component of the actuator assembly shown in FIG. 5.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As used herein, the term "conveyance vehicle" may refer to any type of motorized or non-motorized vehicle having wheels that may be used for transporting people or goods. A conveyance vehicle may include, but is not limited to, non-motorized vehicles such as a trailer, which may include enclosed cargo trailers, flatbed trailers, boat trailers, vehicle trailers, livestock trailers, or dollies, other non-motorized vehicles such as a wagon or bicycle, and motorized vehicles such as a car, motorcycle, recreational vehicle (RV), motor home, golf cart, electric conveyance vehicle (ECV), or scooter. As used herein, the term "axle" refers to any component of a conveyance vehicle that provides a structure for rotatably coupling a wheel hub thereto. As used herein, the terms "locked configuration" and "unlocked configuration" refer to the relative positioning of a locking ring in an axial direction. As used herein, the term "blind nut" refers to any fastener having a threaded open end and an opposing closed end. As used herein, the term "splines" may refer to any surface having ridges, teeth, or any similar structure configured to mate with a corresponding set of splines so as to prevent relative rotation between two components while allowing relative axial movement between the components, and may include a keyway and key arrangement.

Figure 1:
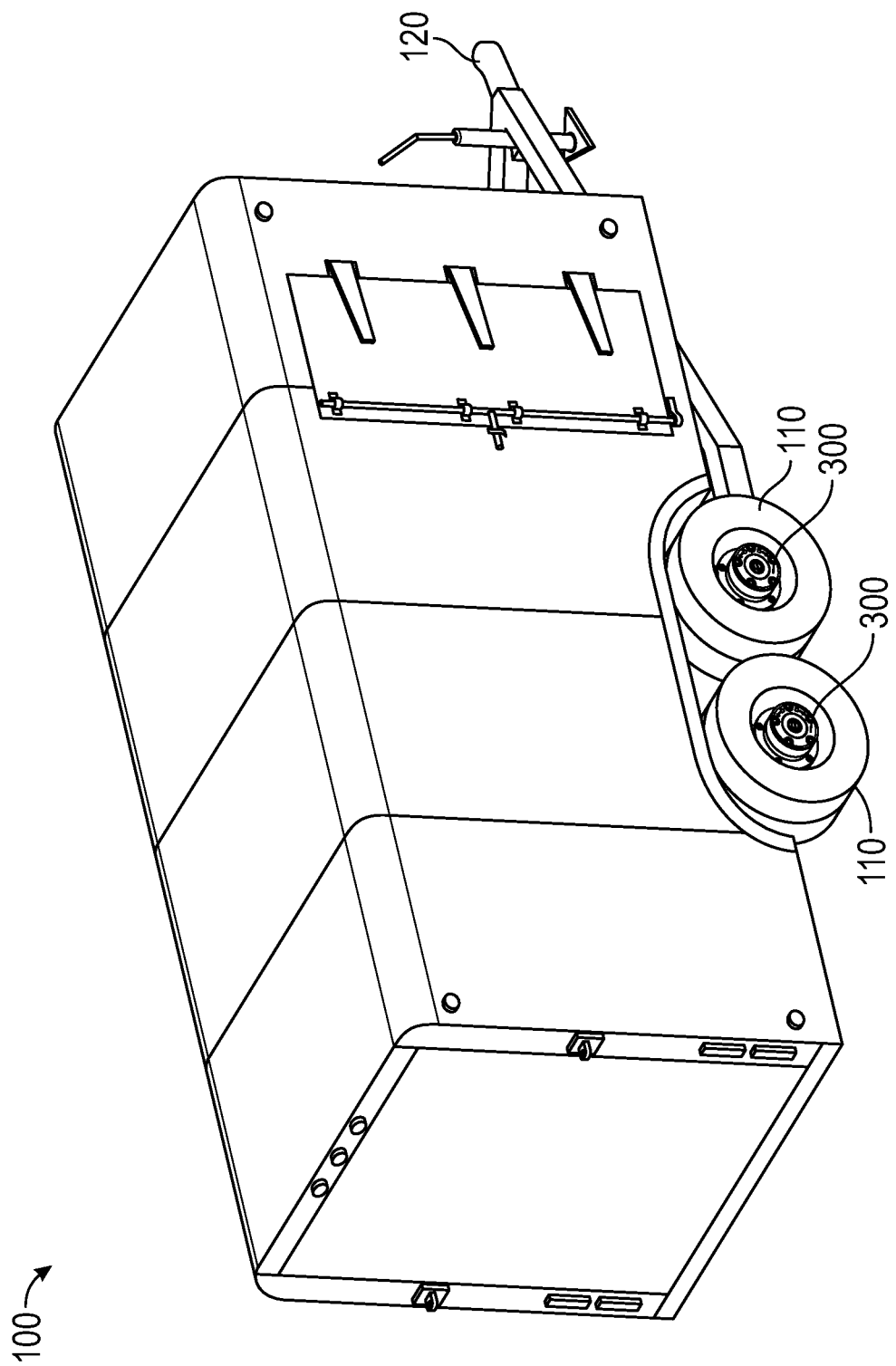
FIG. 1 shows a perspective view of a conveyance vehicle including a locking hub system for locking and unlocking a wheel hub to an axle in accordance with the present disclosure.

Turning now to the drawings, FIG. 1 shows an enclosed cargo trailer 100, which is one example of a conveyance vehicle on which a locking hub system may be installed. The trailer 100 has two wheels 110 on each side with each wheel having a locking hub system 300 for locking the wheel. Each wheel 110 is mounted on a wheel hub 212 that may be rotatably coupled to and positioned around an existing axle 202 of the vehicle, of which an end portion of the existing vehicle axle may be seen in FIG. 2. The trailer 100 has a coupler 120 for hitching the trailer to a trailer hitch ball attached to a motorized vehicle for hauling the trailer. The trailer axle 202 is mounted in a rotationally fixed position and thus does not rotate when the vehicle 100 is in motion. The wheel hub 212 supporting the wheel 110 may be rotatably coupled to the axle 202 and supported by bearings so that the hub 212 and wheel 110 may rotate about the axle while the axle 202 remains in a rotationally fixed position. The trailer 100 shown in FIG. 1 may have a single axle that supports a set of two opposing wheels, or may have individual axles that support each individual wheel 110.

Figure 2:
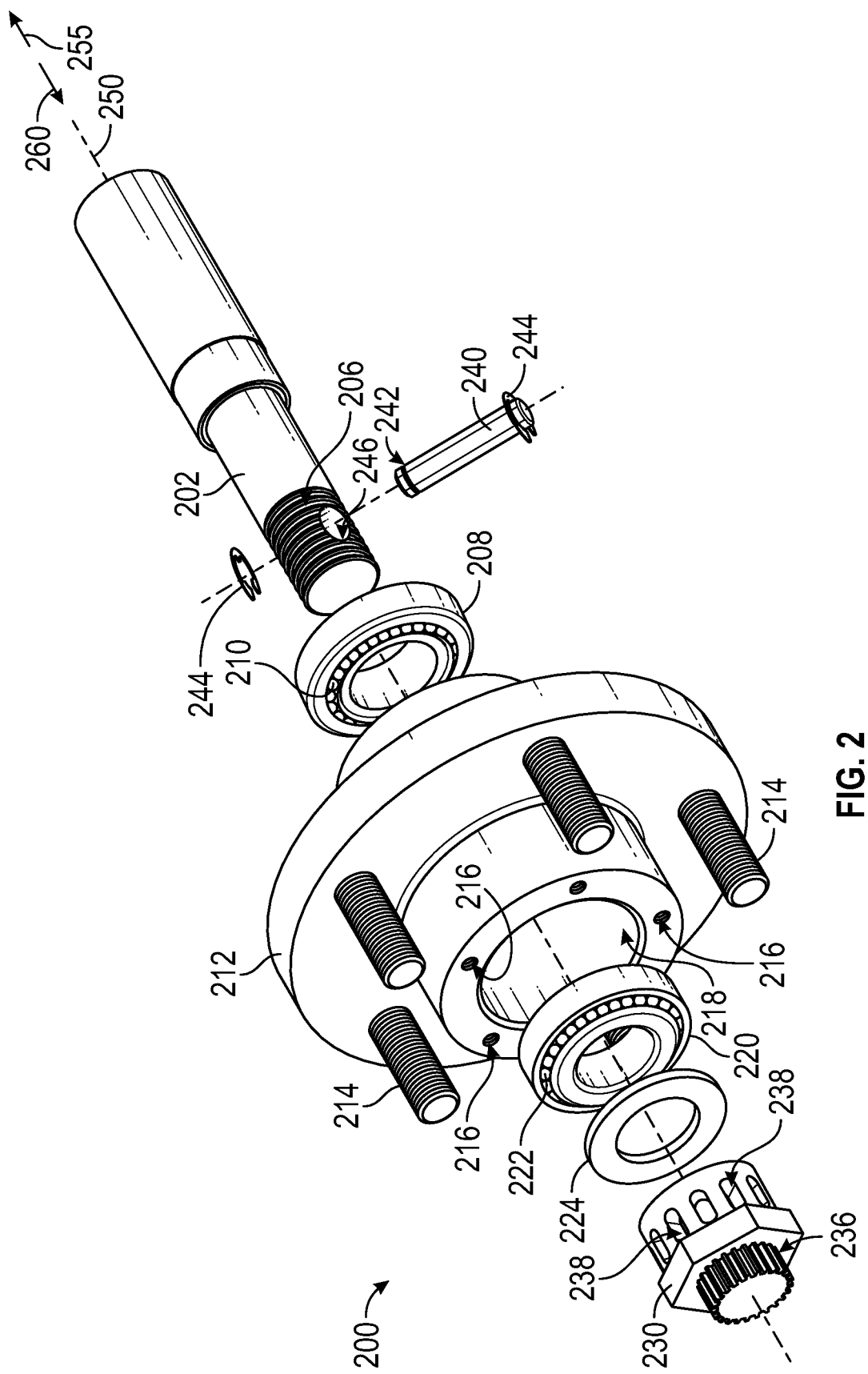
FIG. 2 shows an exploded view of a modified hub assembly for use in a locking hub system in accordance with the present disclosure.
Figure 2A:
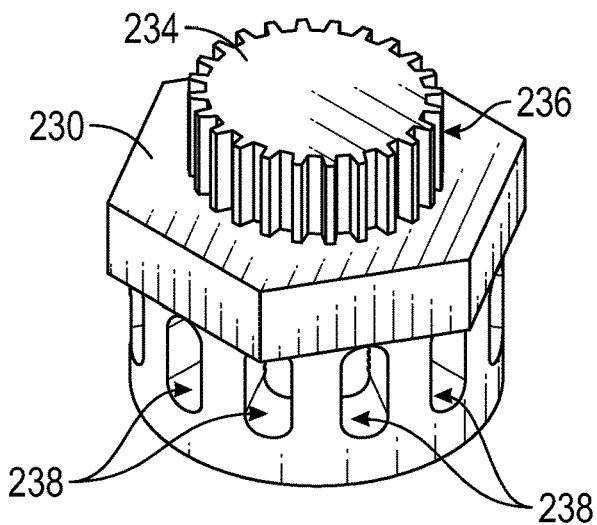
FIG. 2A shows a perspective view of a fastener for fastening a wheel hub to an existing vehicle axle for use in a locking hub system in accordance with the present disclosure.
Figure 2B:
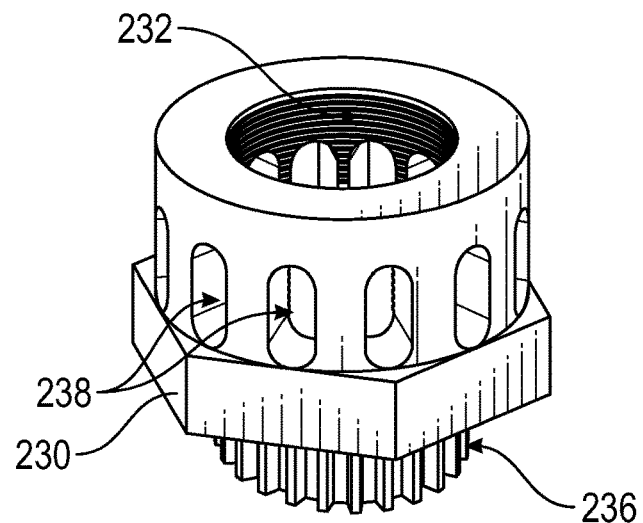
FIG. 2B shows a perspective view of a fastener for fastening a wheel hub to an existing vehicle axle for use in a locking hub system in accordance with the present disclosure.
Figure 2C:
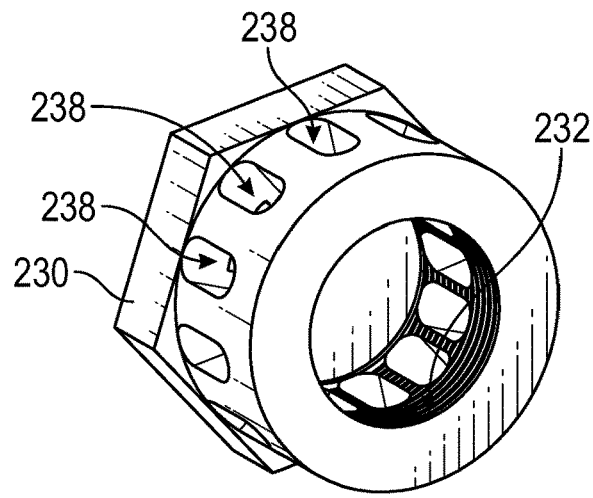
FIG. 2C shows a perspective view of a fastener for fastening a wheel hub to an existing vehicle axle for use in a locking hub system in accordance with the present disclosure.
Figure 3:
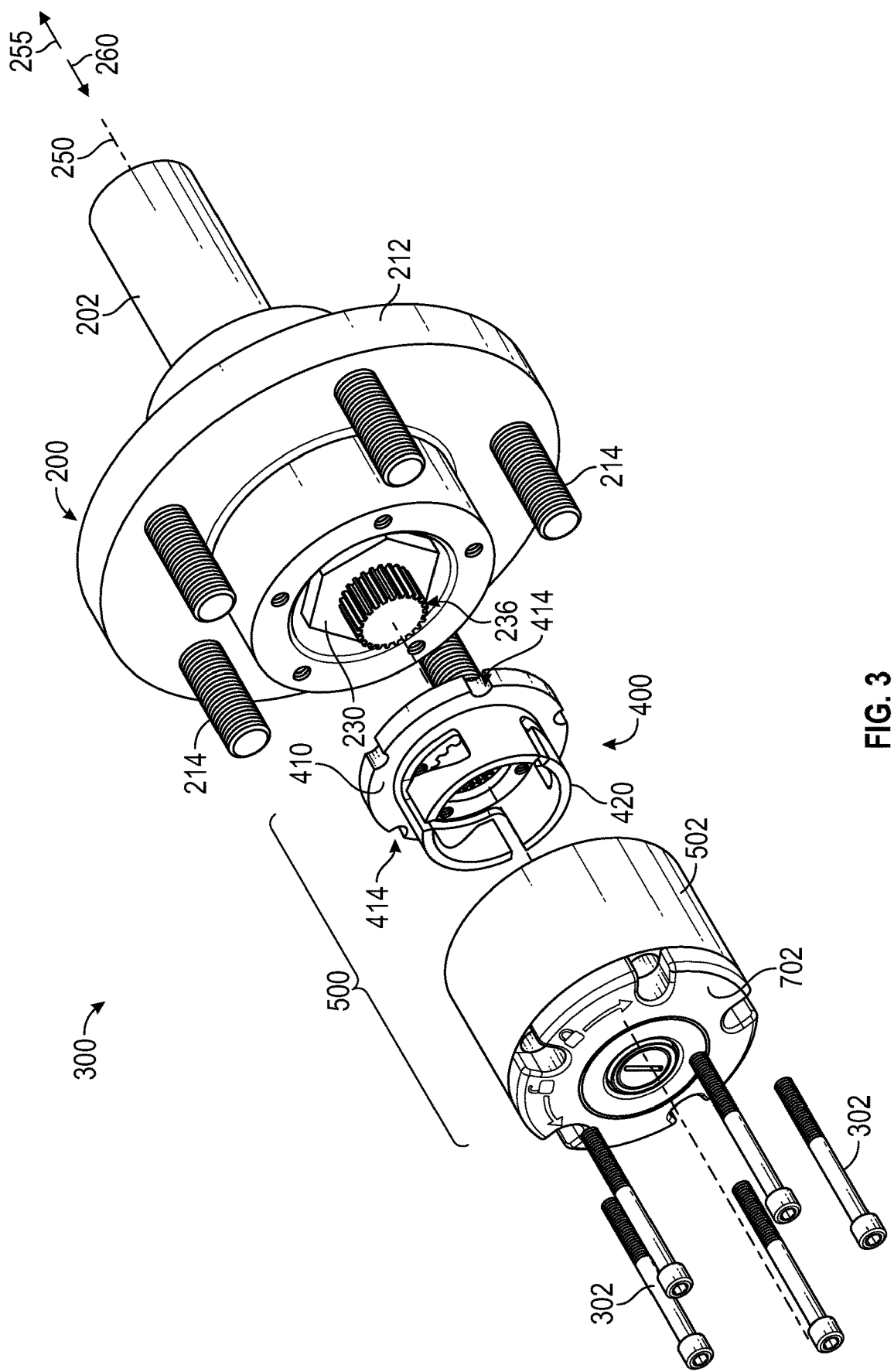
FIG. 3 shows an exploded view of a locking hub system in accordance with the present disclosure.

FIG. 3 shows an exploded view of an illustrative locking hub system 300 that may be used to lock the wheel 110 of the trailer 100 shown in FIG. 1 in a rotationally fixed position relative to an axle 202 of the trailer 100. The system 300 is designed to be retrofitted to an existing axle 202 of an existing trailer 100 or other conveyance vehicle without requiring replacement or modification of the existing axle 202, which typically has a threaded section 206, as seen in FIG. 2, for securing a wheel hub 212 thereto. To facilitate retrofitting the system 300 to an existing axle 202, the system 300 includes a fastener 230, as best seen in FIGS. 2A-2C, configured to fasten a wheel hub 212 to an existing axle 202 such that the wheel hub 212 is rotatably coupled to the axle 202. The fastener 230 has a plurality of splines 236 to provide an engagement surface to allow the hub 212 to be rotationally locked to the fastener 230 to prevent rotation of the wheel 110 about the axle 202. The system 300 has security features designed to prevent unauthorized unlocking of the wheel hub 212 and thus prevent theft of the vehicle 100 by preventing the vehicle from being moved by an unauthorized person through normal operation of the vehicle. To prevent theft, the secure locking hub system 300 should be installed on a fixed axle (i.e., an axle that does not rotate), which generally includes all axles of non-motorized vehicles. On motorized vehicles, at least one axle rotates to drive the motion of the vehicle, but the system 300 may be installed on a non-rotating axle to prevent theft of the vehicle. Multiple locking hub systems 300 may be installed on one or more individual wheels 110 of the vehicle, respectively, to provide greater security.

The system 300 is designed to be switched between a locked configuration and an unlocked configuration. When in the locked configuration, the hub 212 and the wheel mounted thereon are locked such that the hub and wheel will not rotate on the axle 202. With at least one wheel hub 212 of a conveyance vehicle 100 in a rotationally locked position relative to the axle 202, the vehicle cannot move by normal rotation of the wheel 110. When in the unlocked configuration, the hub 212 and wheel mounted thereon may rotate freely so that the vehicle 100 may be operated in a normal manner. A security lock 720 secures the locking hub system 300 in the locked configuration in order to prevent any unauthorized individual from switching the system into the unlocked configuration. Thus, the security lock prevents unauthorized movement of the vehicle. A key configured to operate the lock 720 may be used by an authorized individual to switch the system between the locked and unlocked configurations.

Figure 8:
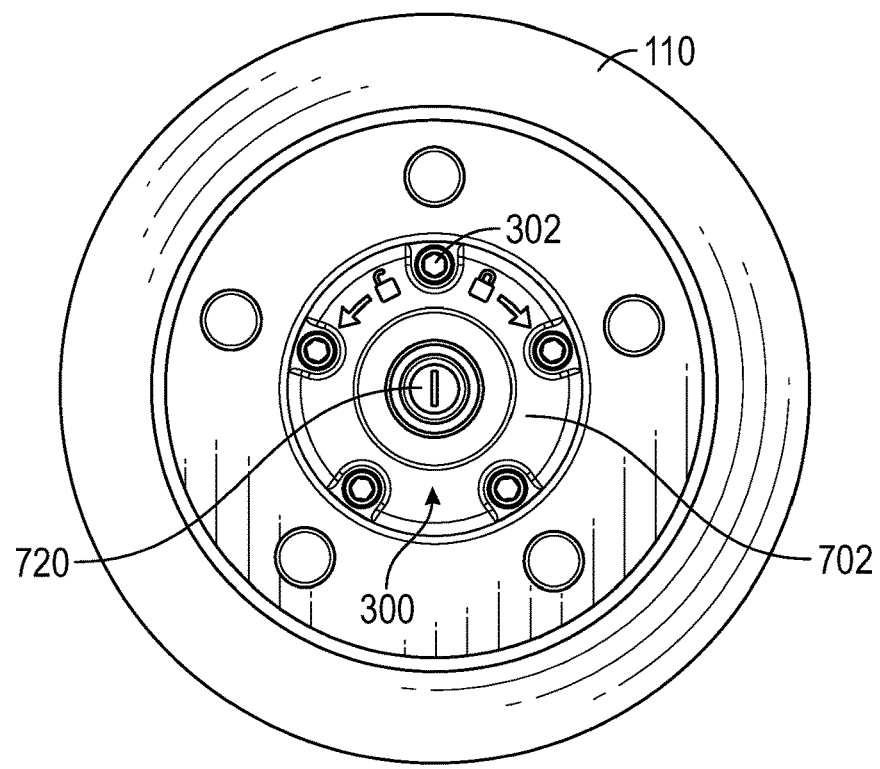
FIG. 8 shows a front elevational view of a locking hub system with a wheel mounted thereon in accordance with the present disclosure.

FIG. 2 shows an exploded view of a hub assembly 200 that may be utilized with the locking hub system 300, in addition to an existing vehicle axle 202 on which the hub assembly 200 may be installed. The hub assembly 200 comprises a wheel hub 212 that may be rotatably coupled to and positioned around the axle 202 of the vehicle 100. The hub assembly 200 further comprises a fastener 230 designed to allow retrofitting of the system 300 to the existing vehicle axle 202. Once the hub is secured to the axle with the fastener 230, the hub 212 and a wheel 110 mounted thereon both rotate about a central axis 250 when the vehicle 100 is in motion. The hub 212 has outwardly facing bolts 214 for mounting a wheel 110 on the hub 212. As used herein, an inward direction refers to a direction extending toward the axle 202, and an outward direction refers to a direction extending away from the axle 202 toward a dial 702 or similar actuating mechanism that is accessible from the exterior of the wheel 110, as shown in FIG. 8. Arrow 255 indicates an inward direction, and arrow 260 indicates an outward direction.

The hub 212 is supported on the axle 202 by at least one bearing so that the hub 212 and wheel 110 may rotate about the axle 202. Preferably, as shown in FIG. 2, the hub assembly 200 comprises an inner bearing 208 having a series of rollers 210 and an outer bearing 220 also having a series of rollers 222. An outer surface of each bearing 208 and 220 may function as a race that, when installed in the hub 212, is in face sharing contact with an inner surface of the hub 212 so that the outer surface of each bearing 208 and 220 rotates with the hub 212 on rollers 210 and 222. Other suitable types of bearings may be utilized for rotatably coupling the hub 212 to the axle 202.

To install the hub assembly 200 for use in the locking hub system 300, the inner bearing 208 and outer bearing 220 may be installed within the hub 212. The hub 212 may then be installed around the axle 202 through a central opening 218 of the hub 212 so that an inner surface of each bearing 208 and 220 are in face sharing contact with a smooth surface portion of the axle 202. A bearing seal may be utilized to prevent grease from leaking out and water from getting into the hub 212 after installation.

To complete the installation of the hub assembly 200, the wheel hub 212 is lastly secured to the axle 202 with the fastener 230 such that the hub 212 is rotatably coupled to the axle 202. Preferably, as shown in FIG. 2, a thrust washer 224 is installed between the outer bearing 220 and the fastener 230, which secures the hub 212 and bearings 208 and 220 on the axle 202. The fastener 230 may be threaded onto a male threaded section 206 of the axle 202. The bearings 208 and 220 support the hub 212 on the axle 202, and the fastener 230 secures the assembly 200 to the axle 202.

In a preferred embodiment, as best seen in FIGS. 2A-2C, the fastener is a nut 230 having female threads 232 configured to mate with the male threads 206 of the axle 202 to secure the hub 212 to the axle. Preferably, the nut 230 is a blind nut with the female threads 232 at an open end opposite a closed end. The nut 230 has a plurality of splines 236 that provide an engagement surface to allow the hub 212 to be rotationally locked to the nut 230 to prevent rotation of the hub 212 about the axle 202 when locked to the nut. The splines 236 are disposed radially about an axis of rotation of the nut 230. The splines 236 are configured to mate with a locking ring 410 that locks the hub 212 in a rotationally fixed position relative to the axle 202. When the locking ring 410 is mated with the splines of the nut 230, the system 300 is in the locked configuration. Preferably, the nut 230 has an extension 234 extending outwardly in an axial direction from the closed end, and the splines 236 are positioned externally around a circumference of the extension 234, as shown in FIGS. 2A and 2B. The nut 230 has a polygonal engagement surface for applying torque to the nut 230 using a wrench or similar tool for threading the nut onto or off of the axle. The extension 234 preferably extends in an outward direction from a portion of the nut 230 having the polygonal engagement surface, as best seen in FIG. 2A.

In a preferred embodiment, the hub assembly 200 further comprises a pin 240 that may be inserted through two opposing openings 238 in the nut 230 and through a hole 246 extending through the axle 202 when the nut 230 is threaded onto the axle. The pin 240 is preferably a headless pin having two circumferential grooves 242 at opposing ends of the pin. In this embodiment, the hub assembly 200 further comprises retaining clips 244 sized to fit into the grooves 242 to secure the pin 240 in place after insertion through the nut openings 238 and the hole 246 in the axle. Once inserted, the pin 240 prevents rotation of the nut 230 in either a clockwise or counterclockwise direction. When installing the hub assembly 200, once the nut 230 is fully tightened onto the axle 202 in a clockwise direction, further rotation of the nut in a clockwise direction is limited by the hub assembly. However, counterclockwise rotation of the nut 230 could occur if an attempt is made to move the vehicle 100 while the locking ring 410 is mated with the fastener splines 236 in the locked configuration. The pin 240 will prevent such rotation. However, even if such an attempt is made without the pin 240 in place, the extent of relative counterclockwise rotation may be limited by the system 300, as discussed below. The nut 230 preferably has a plurality of spaced openings 238 positioned around a circumference of the nut so that two opposing openings 238 may be aligned with the hole 246 in the axle 202 when the nut 230 is fully tightened regardless of the starting position of the nut when beginning the process of threading the nut onto the axle.

FIG. 3 shows the hub assembly 200 in an assembled state in which the hub 212 is rotatably coupled to the existing vehicle axle 202. As shown in FIG. 3, when assembled the splines 236 of the nut 230 extend in an outward axial direction from the end of the axle 202. The outwardly extending fastener splines 236 provide a surface for the locking ring splines 412 to engage in order to prevent relative rotation between the hub 212 and nut 230. When the hub assembly 200 is assembled with the nut 230 fully tightened to secure the hub 212 to the axle 202, engagement of the locking ring splines 412 with the fastener splines 236 will also prevent relative rotation between the hub 212 and the axle 202, which prevents unauthorized movement of the vehicle 100.

Figure 4:
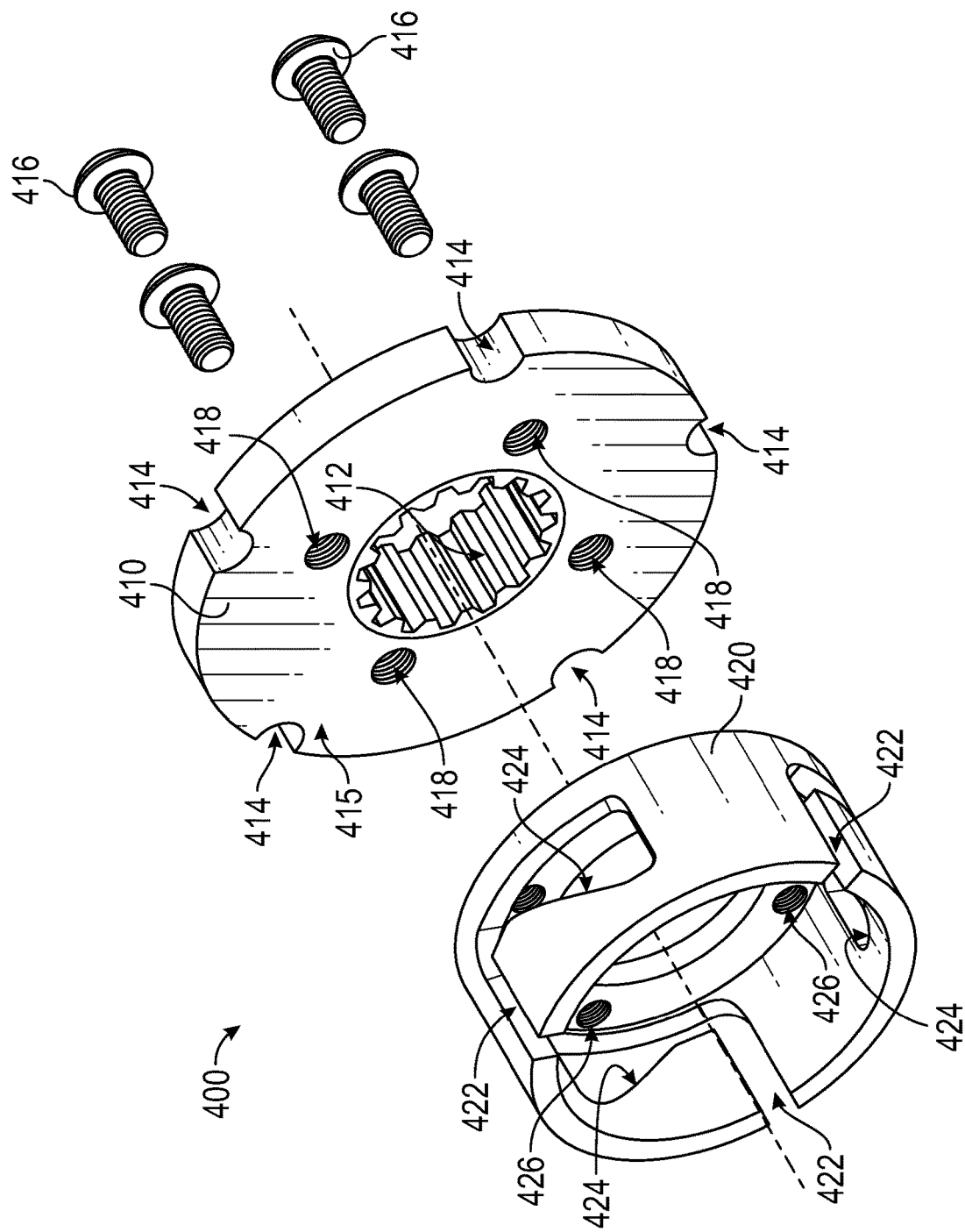
FIG. 4 shows an exploded view of a locking ring assembly for a locking hub system in accordance with the present disclosure.
Figure 12:
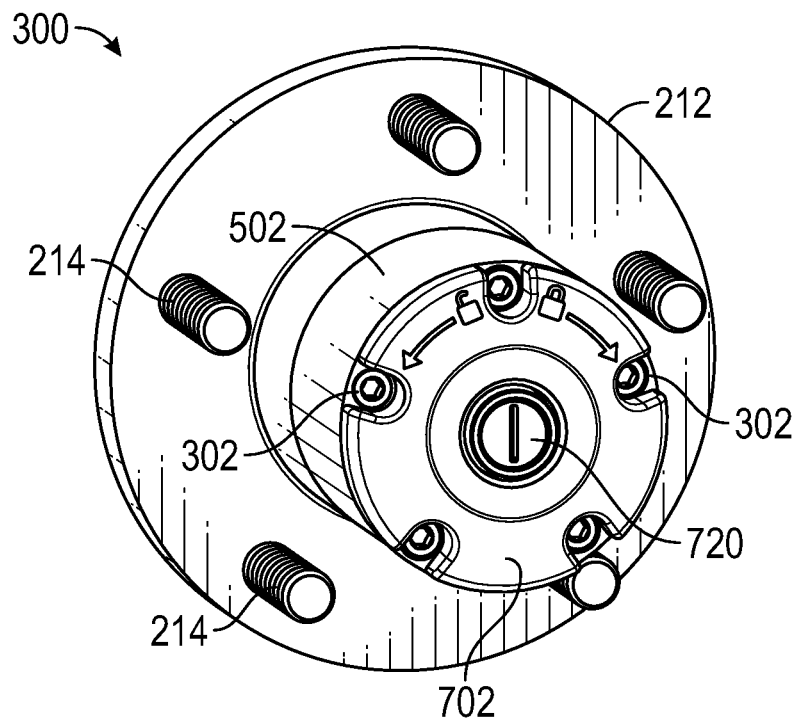
FIG. 12 shows a perspective view of an assembled locking hub system with a dial in an unlocked position in accordance with the present disclosure.
Figure 13:
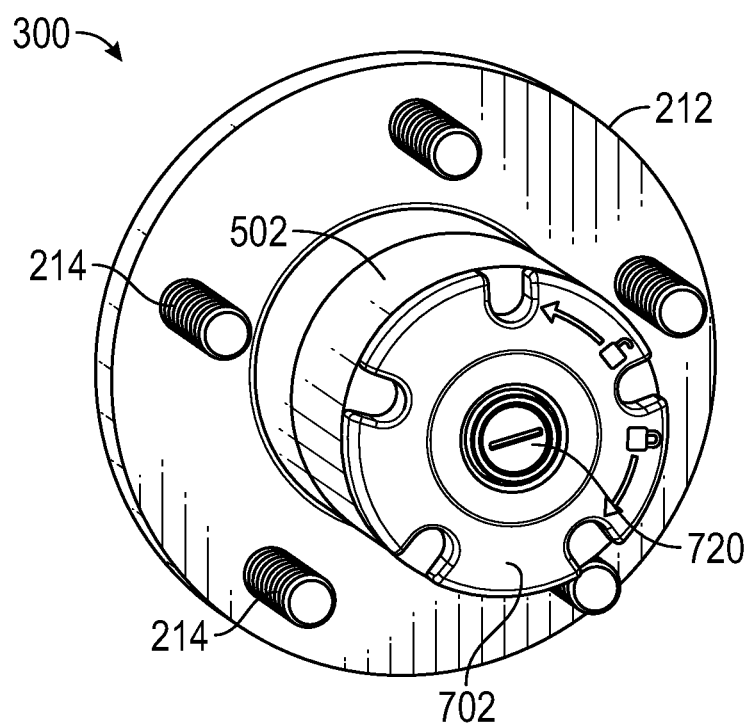
FIG. 13 shows a perspective view of an assembled locking hub system with the dial in a locked position in accordance with the present disclosure.

FIG. 3 shows an exploded view of the secure locking hub system 300, which includes the hub assembly 200 and an actuator assembly 500, which includes a locking ring assembly 400. FIG. 5 shows the actuator assembly 500, and FIG. 4 shows the locking ring assembly 400. The actuator assembly 500 includes the locking ring assembly 400, a cap assembly 700, a housing 502, a coil spring 506, and a retaining clip 504. When the actuator assembly 500 is in an assembled state, the locking ring assembly 400 is disposed within the housing 502, and the locking ring 410 is resiliently biased in an inward direction 255 by the spring 506. The assembled actuator assembly 500 may be secured to the hub 212 utilizing bolts 302 to complete assembly of the locking hub system 300, as shown in FIGS. 12 and 13.

As shown in FIG. 4, in a preferred embodiment, the locking ring assembly 400 comprises a locking ring 410 and a cam 420. The locking ring 410 moves back and forth in an axial direction between the locked and unlocked configurations. The locking ring 410 is configured to mate with the splines 236 of the fastener 230 in the locked configuration and to decouple from the fastener splines 236 in the unlocked configuration. The locking ring 410 moves in an inward direction 255 to mate with the splines 236 and in an outward direction 260 to decouple from the splines 236. The hub 212 is rotationally fixed relative to the axle 202, as well as the nut 230, in the locked configuration and free to rotate about the axle 202 in the unlocked configuration. In a preferred embodiment, as shown in FIG. 4, the locking ring 410 has internal splines 412 configured to mate with the splines 236 of the nut 230 when the nut is threaded onto the axle 202. The locking ring 410 has grooves 414 positioned around an outer edge of the ring 410 that correspond to each of the bolts 302, respectively, that fasten the actuator assembly 500 to the hub 212. When assembled, a fastening bolt 302 fits within each groove 414 of the locking ring 410 to prevent rotation of the ring 410 inside the housing 502. The locking ring 410 may be secured to the cam 420 with threaded fasteners 416 screwed into threaded holes 418 in the locking ring 410 and threaded holes 426 in the cam 420. The cam 420 has ramped surfaces 424 that engage with pins 708 of the cap assembly 700 to move the locking ring 410 back and forth in an axial direction.

The locking hub system 300 further comprises an actuator operably connected to the locking ring 410 and configured to move the locking ring 410 in an axial direction between the locked configuration and the unlocked configuration. The system 300 also comprises a lock configured to selectively limit operation of the actuator. The actuator may be any suitable type of actuator that allows an authorized user to actuate axial movement of the locking ring from the exterior of a wheel hub in order to lock the hub in a rotationally fixed position relative to an axle and to unlock the hub to allow the hub to rotate freely about the axle. In a preferred embodiment, the actuator is a mechanical actuator comprising a dial 702 operably connected to the locking ring 410 and configured to move the locking ring 410 in an axial direction between the locked configuration and the unlocked configuration in response to rotational movement of the dial 702. In this embodiment, the lock 720 is configured to selectively limit rotational movement of the dial 702.

Figure 7:
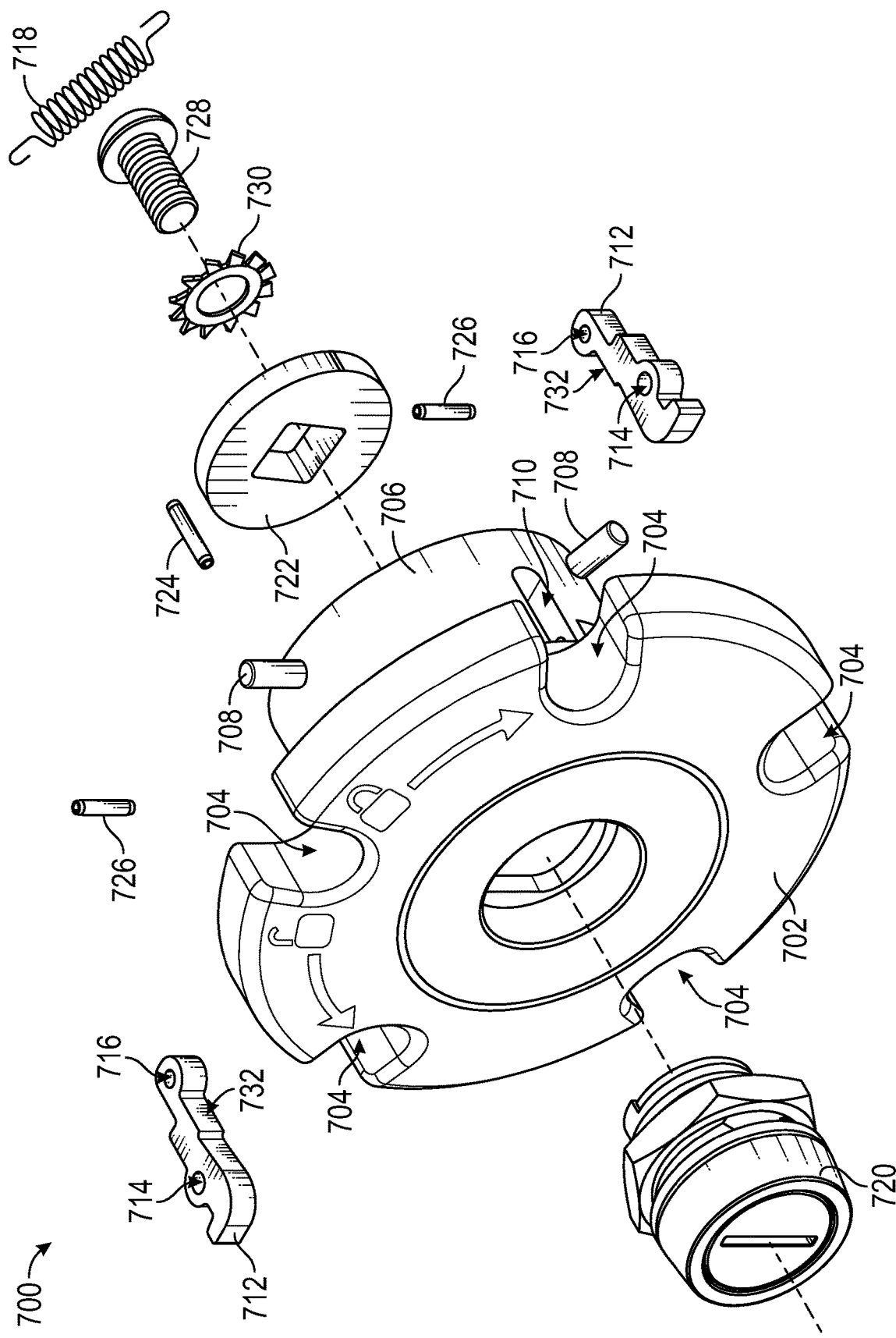
FIG. 7 shows an exploded view of a cap assembly for a locking hub system in accordance with the present disclosure.

FIG. 7 illustrates an exploded view of an example cap assembly 700, which includes a dial 702 and functions as the actuator, and FIG. 5 shows the cap assembly 700 in an assembled state. The dial 702 has an actuating extension 706, which has attached pins 708 extending radially outward. The pins 708 engage with ramped surfaces 424 of the cam 420 to move the locking ring 410 in an axial direction. The actuating extension 706 preferably has three pins 708 spaced equidistantly around a perimeter of the extension (two of the three pins 708 are visible in FIGS. 5 and 7). The dial 702 may be rotated in one direction to move the locking ring 410 into the locked configuration, in which it is mated with the fastener splines 236, and in an opposite direction to move the locking ring 410 into the unlocked configuration, in which it is decoupled from the fastener splines 236. For example, as indicated by the arrows displayed on the dial 702 in FIG. 7, rotating the dial clockwise locks the hub in a rotationally fixed position by mating the locking ring 410 with the nut 230, and rotating the dial counter clockwise unlocks the hub so that it may rotate freely.

Figure 10:
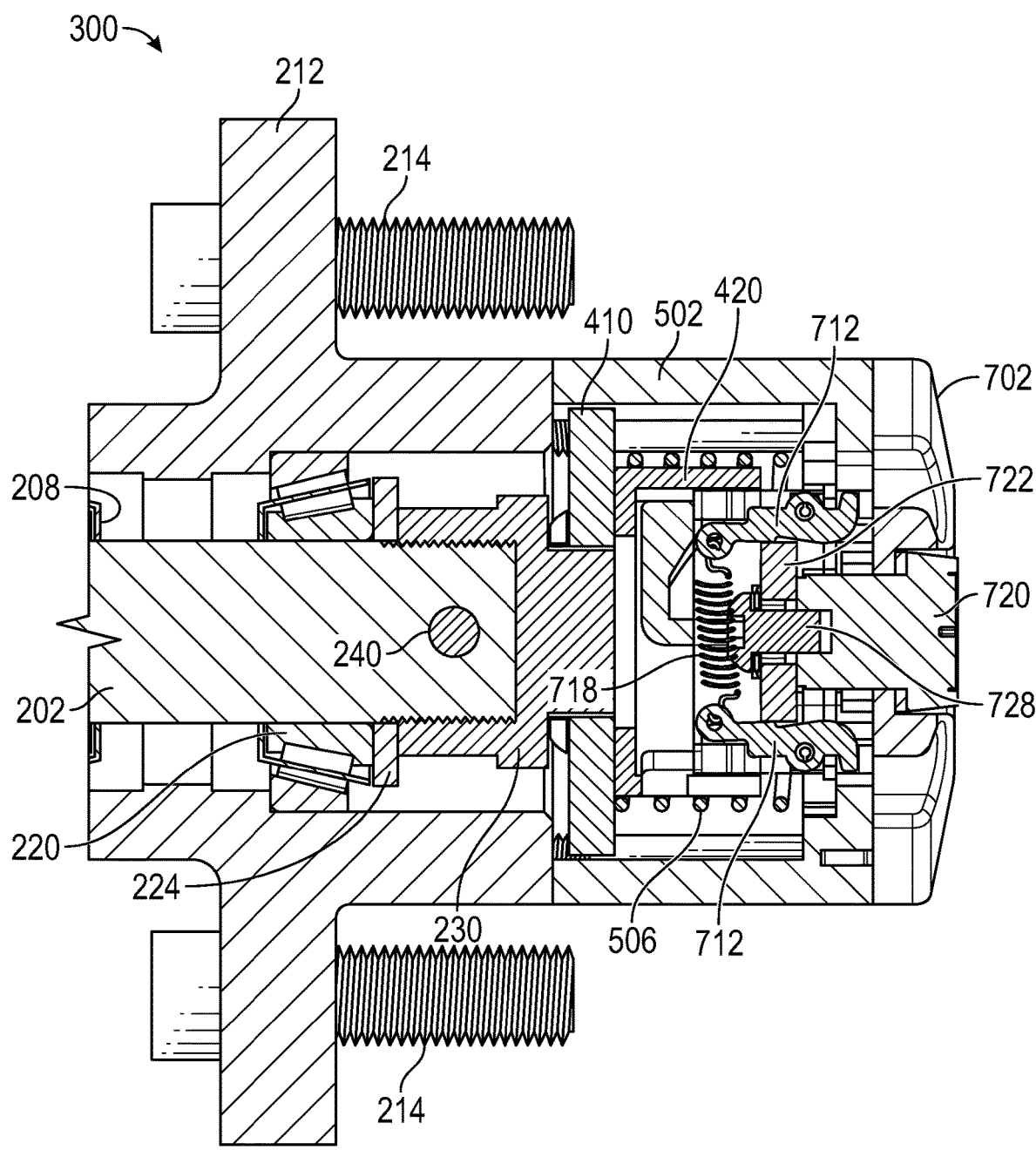
FIG. 10 shows a cross-sectional view of the assembled locking hub system shown in FIG. 9 with the locking ring in the locked configuration and with the cross-sectional plane in line with two opposing lock pawls.
Figure 11:
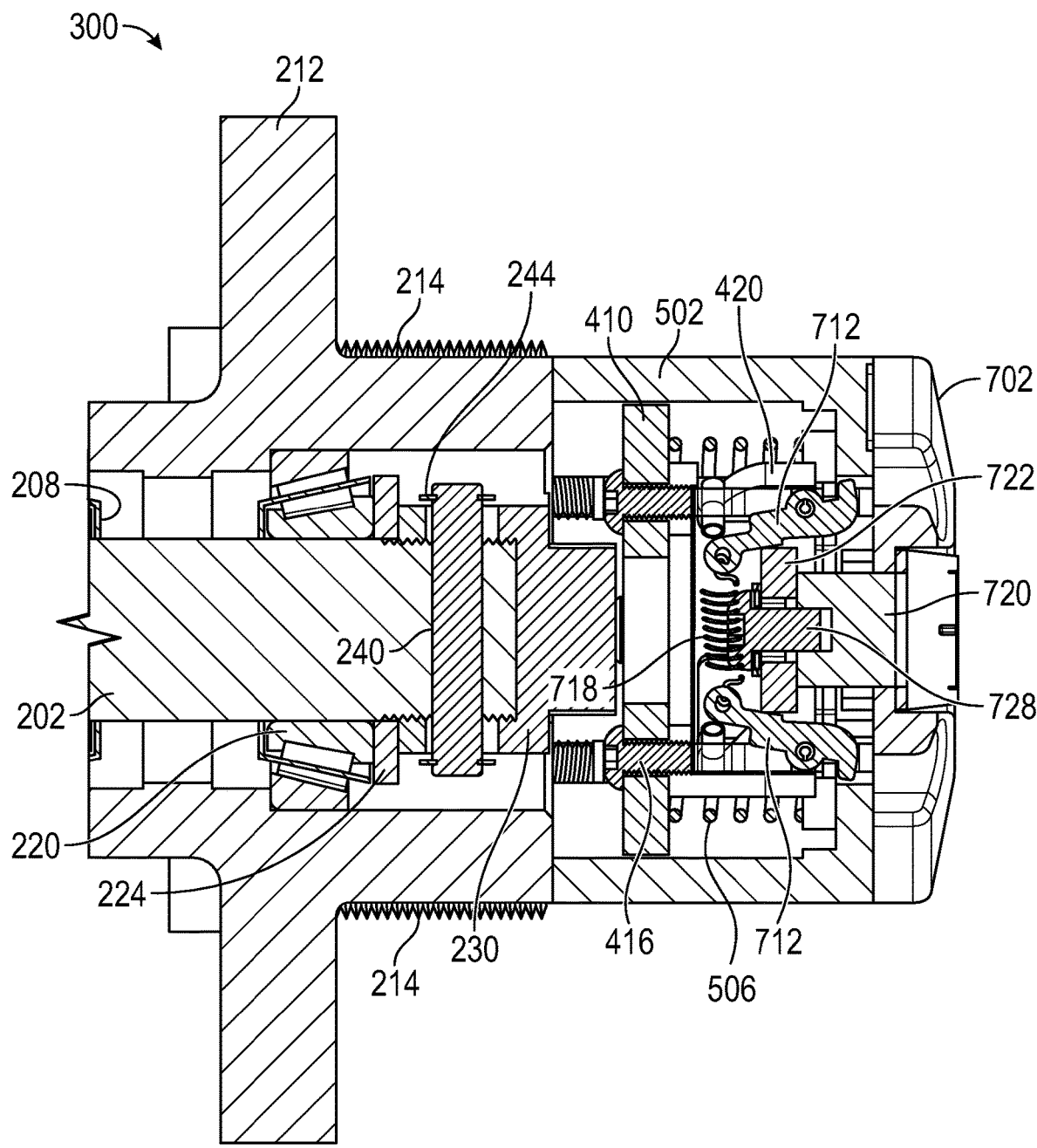
FIG. 11 shows a cross-sectional view of the assembled locking hub system shown in FIG. 9 with the locking ring in the unlocked configuration and with the cross-sectional plane rotated from the plane shown in FIG. 10 to remain in line with the opposing lock pawls.

The cap assembly 700 provides an exterior cover for the locking hub system 300 with an externally accessible dial 702 and security lock 720, which may be operated by a unique key for locking and unlocking the lock 720. The lock 720 is preferably a cam lock having a rotating cam 722. The lock 720 is secured to the dial 702 such that only an external face of the lock 720 with a keyhole therein is accessible, as shown in FIGS. 12 and 13. The lock 720 is preferably permanently attached to the dial 702 so that the lock cannot be tampered with or otherwise compromised. The rotating lock cam 722 may be secured to the lock 720 with a cam screw 728 and lock washer 730. The lock cam 722 rotates in response to input from a key configured to operate the lock. A rotation limit pin 724 limits clockwise and counter clockwise rotation of the cam 722. The assembly 700 further comprises opposing lock pawls 712 that lock the dial 702 in a fixed position. The actuating extension 706 has two opposing lock pawl openings 710 (only one opening is visible in FIG. 7) in which each lock pawl 712 is installed. A pivot pin 726 is disposed within an opening 714 in each lock pawl 712 and secured to the actuating extension 706 so that the pawls 712 are each positioned within a pawl opening 710. Each lock pawl 712 may rotate about the pivot pin 726. Each end of a spring 718 is secured to a second opening 716 in each respective pawl 712, as shown in FIGS. 10 and 11. The spring 718 pulls the ends of the pawls 712 to which the spring is secured toward each other. Due to the pivoting motion about the pivot pins 726, an opposite end of each pawl 712 is thus resiliently biased in a radially outward direction from axis 250. FIG. 11 illustrates the pawls 712 in this position. The rotating cam 722 is configured so that it contacts a surface area 732 of each pawl 712, as shown in FIGS. 10 and 11. When the cam 722 rotates in response to input from a key to unlock the lock 720, it forces the end of each pawl 712 to which the spring is secured to move in a radially outward direction against the force of the spring, thereby causing the opposite end of each pawl to move in a radially inward direction. FIG. 10 illustrates the pawls 712 in this position. Rotating the cam 722 in an opposite direction (i.e., to lock the lock 720) reduces the force on each pawl 712, thereby returning the pawls to the previous position in which the opposite ends are resiliently biased in a radially outward direction. As discussed below, the position of the pawls 712 determines whether the dial 702 is locked in place or whether the dial may be rotated to move the locking ring 410 between the locked and unlocked configurations. It should be understood that other suitable locking mechanisms may be utilized to lock the dial 702 in place so that the dial does not rotate.

FIG. 5 shows components of the actuator assembly 500, which includes a housing 502. FIG. 6 shows a perspective view of the housing 502 from the opposite side as shown in FIG. 5. FIG. 5 also illustrates the cap assembly 700 and locking ring assembly 400 both in an assembled state. To install the locking hub system 300, the actuator assembly 500 is assembled and fastened to the hub assembly 200. To assemble the actuator assembly 500, the cap assembly 700, including the dial 702, is secured to the housing 502. The actuating extension 706 is inserted into an outward facing opening in the housing 502 by aligning the pins 708 with corresponding grooves 510A, 510B, and 510C spaced around the housing opening. The actuating extension 706 is inserted into the housing 502 while the dial 702 remains on the exterior of the housing 502, as shown in FIG. 3. As best seen in FIG. 6, the interior of the housing 502 has a larger diameter than the opening through which the actuating extension 706 is inserted so that the actuating extension 706 and pins 708 may rotate within the housing when the dial 702 is rotated. The cap assembly 700 may be secured to the housing 502 with a retaining clip 504. A compression spring 506 is disposed within the housing 502 between the dial 702 and the locking ring 410. When assembled, the spring 506 contacts an inner facing surface 516 in the interior of the housing 502, as shown in FIG. 6, and also contacts an outward facing surface 415 of the locking ring 410. Thus, the locking ring 410 is biased in an inward axial direction 255 by the spring 506.

To complete the actuator assembly 500, the locking ring assembly 400 is inserted into the housing 502 so that the pins 708 of the cap assembly 700 are aligned with corresponding openings 422 on the cam 420, as best seen in FIG. 4. The locking ring assembly 400 is inserted until the pins 708 pass through the cam openings 422, and the assembly 400 is then rotated until the pins 708 engage with corresponding ramped surfaces 424 of the cam 420. The pins 708 engagement with the ramped surfaces 424 of the cam 420, along with the retaining clip 504, keep the cap assembly 700 secured to the housing 502. When fully assembled, the ramped surfaces 424 engage with the pins 708 to translate rotational movement of the dial 702 into axial movement of the locking ring 410. The force of the spring 506 pushes the locking ring 410 in an inward axial direction 255 so that the pins 708 remain engaged with the ramped surfaces 424.

Thus, from the perspective shown in FIG. 5, when the dial 702 is rotated in a clockwise direction, the pins 708 also move in a clockwise direction while engaged with the ramped surfaces 424 of the cam 420, which does not rotate inside the housing 502. The pins 708 move along each of the ramped surfaces 424, and this motion allows the locking ring 410 to move axially in an inward direction 255 due to the force of the spring 506 biasing the locking ring 410 inwardly. The inward axial motion of the locking ring 410, which moves the locking ring into the locked configuration, causes the splines 412 of the locking ring to mate with the splines 236 of the nut 230, which locks the hub 212 in a rotationally fixed position relative to the axle 202. When the dial 702 is rotated in a counter clockwise direction, the pins 708 move in a counter clockwise direction while engaged with the ramped surfaces 424 of the cam 420, thereby forcing the locking ring 410 to move axially in an outward direction 260 against the force of the spring 506. The outward axial motion of the locking ring 410, which moves the locking ring into the unlocked configuration, causes the splines 412 of the locking ring to then decouple from the splines 236 of the nut 230, which allows the hub 212 to freely rotate about the axle 202. FIG. 10 illustrates the locking ring 410 mated with the fastener splines 236 in the locked configuration, and FIG. 11 illustrates the locking ring 410 decoupled from the fastener splines 236 in the unlocked configuration.

To complete installation of the system 300, bolts 302 may be utilized to fasten the actuator assembly 500 to the hub assembly 200, as shown in FIG. 3. The dial 702 has a plurality of spaced indentations 704 that each correspond to a respective bolt opening 508 in the housing 502, as shown in FIG. 5. In a preferred embodiment, an interior wall of the housing 502 has a plurality of grooves 514 adjacent to and aligned with each of the bolt openings 508, respectively, as best seen in FIG. 6. To assemble the system 300, the indentations 704 on the dial, the bolt openings 508 and grooves 514 in the housing 502, and the grooves 414 of the locking ring 410 are all aligned with bolt holes 216 in the hub 212. The bolts 302 may then be inserted through the indentations 704 on the dial, the bolt openings 508 and grooves 514 in the housing 502, and the grooves 414 of the locking ring 410 and threaded into the bolt holes 216 in the hub 212 to fasten the actuator assembly 500 to the hub 212. The locking ring 410 has a slightly smaller diameter than the interior of the housing 502 so that each groove 514 in the housing 502 and each corresponding groove 414 in the locking ring 410 forms a generally circular opening that surrounds the shank of each bolt 302 when the locking ring 410 is positioned within the housing 502. Thus, when assembled, each bolt 302 is positioned within one of the grooves 414 in the locking ring 410, which prevents the locking ring 410 from rotating inside the housing 502. Thus, when the dial 702 is rotated, the locking ring 410 can move only in an axial direction 255 or 260 between the locked and unlocked configurations and cannot rotate within the housing.

If an attempt is made to move the vehicle 100 with the locking ring 410 in the locked configuration (for instance, in an attempted theft of the vehicle), rotational force will be applied to the wheels 110 of the vehicle, which will in turn cause the locking ring 410 to apply torque to the nut 230 in either a clockwise or counterclockwise direction, depending on whether the wheel is on the right side or the left side of the vehicle, respectively. When fully tightened, the nut 230 will not further rotate in a clockwise direction (the nut 230 and axle 202 preferably have right hand threads). Thus, it is preferred to install at least one locking hub system 300 on a wheel 110 on the right side of the vehicle 100, if possible (if utilizing a system 300 with right hand threads). If a pin 240 is utilized, the pin will prevent rotation of the nut 230 in either direction. Thus, use of a pin 240 is preferred, in which case a locking hub system may be installed on wheels on either side of the vehicle. Existing vehicle axles 202 typically have an existing hole 246 extending therethrough for installation of a conventional wheel hub, which typically utilizes a cotter pin to prevent rotation of a castle nut used to fasten a conventional hub assembly to an axle. The pin 240 may be sized for insertion through the hole 246 to allow utilization of the existing axle hole 246 when the nut 230 is threaded onto the axle. The openings 238 in the nut 230 are sized to allow insertion of the pin 240 therethrough. The openings 238 are preferably elongated in an axial direction, as best seen in FIG. 2B, to accommodate existing axles 202 of different vehicles 100 that may have holes 246 in slightly varying locations on the axle.

In the case in which a pin 240 is not utilized, counterclockwise rotation of the nut 230 will be limited by the internal dimensions of the system 300. For instance, counterclockwise rotation of the nut 230 will cause the locking ring 410 to move in an outward direction against the force of the spring 506, and this outward movement may be limited by the size of the cam 420 due to the cam contacting an inner facing surface 516 in the interior of the housing 502. In this case, the nut 230 may be partially loosened from the axle 202, but the threads 232 of the nut 230 are sized so that the nut will remain secured to the axle.

In a preferred embodiment, when the indentations 704 on the dial 702 are aligned with the bolt openings 508 and grooves 514 in the housing 502, the grooves 414 of the locking ring 410, and the bolt holes 216 in the hub 212, the cam 420 and locking ring 410 are in the unlocked configuration. Thus, when the bolts 302 are inserted through the indentations 704 on the dial 702 and threaded into the holes 216 in the hub 212 to complete assembly of the locking hub system 300, the system is initially in the unlocked configuration. In the unlocked configuration, the heads of each bolt 302 are accessible through the indentations 704 on the dial 702, as shown in FIG. 12. The dial 702 may then be rotated to actuate the locking ring 410 to move inward to mate with the fastener splines 236 in order to move the locking ring into the locked configuration. As shown in FIG. 13, the dial 702 is configured to cover a head of each bolt 302 when the locking ring 410 is in the locked configuration. Thus, the system 300 must be in the unlocked configuration to access the bolts 302 to disassemble the system. This feature prevents removal of the bolts 302 by an unauthorized individual for the purpose of disassembling the system to circumvent the security lock 720. In a preferred embodiment, the bolts 302 each have a tamper-proof head for additional security. Thus, the head of each bolt 302 may have a non-standard engagement surface so that the bolts cannot be removed using standard commercially available tools such as a standard wrench, a socket wrench, a screwdriver, or a hex key. A specially adapted tool may be provided with the system 300 for engaging the bolt 302 heads for authorized assembly and disassembly of the system 300.

The security lock 720 is configured to selectively limit rotational movement of the dial 702. When the locking hub system is in the locked configuration so that the hub 212 is rotationally locked in place relative to the axle 202, the security lock 720 may be used to lock the dial 702 in place so that an unauthorized individual cannot rotate the dial 702 to move the locking ring 410 into the unlocked configuration. Optionally, the dial 702 may also be locked in place when the system is in the unlocked configuration, as shown in FIG. 12. The grooves 510A, 510B, and 510C spaced around the housing opening, as shown in FIG. 5, provide space through which the pins 708 may be inserted when securing the cap assembly 700 to the housing 502. Grooves 510A and 510B additionally function as slots for the locking pawls 712, in addition to grooves 512A and 512B. When the dial 702 is unlocked (i.e., the dial may be rotated), the locking pawls 712 are positioned within the lock pawl openings 710 in the dial 702 and do not extend radially outward from the openings 710. A unique key configured to operate the lock 720 may be used to initiate rotation of the lock cam 722 to pivot the two opposing pawls 712 so that one end of each pawl moves radially outward and into one of a pair of grooves, which may be either grooves 510A and 512A or grooves 510B and 512B, depending on the position of the dial 702. When the pawls 712 are positioned in grooves 510A and 512A or in grooves 510B and 512B, the dial 702 is locked in place and cannot be rotated. When the pawls 712 are retracted back into the lock pawl openings 710, the dial 702 may be rotated to actuate the locking ring 410.

For instance, the dial 702 may be rotated counter clockwise to move the locking ring 410 into the unlocked configuration, in which the locking ring assembly 400 is pulled in an outward direction 260 by the dial pins 708 against the force of the spring 506, and in this configuration the opposing pawls 712 may be positioned adjacent to grooves 510B and 512B. Counter clockwise rotation of the dial 702 may be limited by the size of the cam 420 due to the cam contacting an inner facing surface 516 in the interior of the housing 502 or by another suitable means of limitation. A key to the lock 720 may then be used to initiate rotation of the lock cam 722 to move the lock pawls 712 into grooves 510B and 512B of the housing 502. This action of the pawls 712 locks the dial 702 in place relative to the housing 502 such that the dial cannot be rotated to actuate the locking ring 410 until it is unlocked using the key. Once unlocked by the key, the dial 702 may then be rotated within the housing 502 in a clockwise direction to move the locking ring 410 into the locked configuration, in which the locking ring 410 mates with the fastener splines 236. In this configuration, the opposing pawls 712 may now be positioned adjacent to grooves 510A and 512A. The key may be then be used to activate the lock 720 to move the lock pawls 712 into grooves 510A and 512A. The dial 702 is then locked in place such that it cannot be rotated, and the locking ring 410 is in the locked configuration with the dial 702 covering the bolt 302 heads, as shown in FIG. 13. In this configuration, the locking hub system 300 is secure, and the vehicle on which the system is installed cannot be moved by any unauthorized person not in possession of a key to the lock. Thus, in a preferred embodiment, the dial 702 may be locked whether the locking ring 410 is in the locked or the unlocked configuration.

Figure 9:
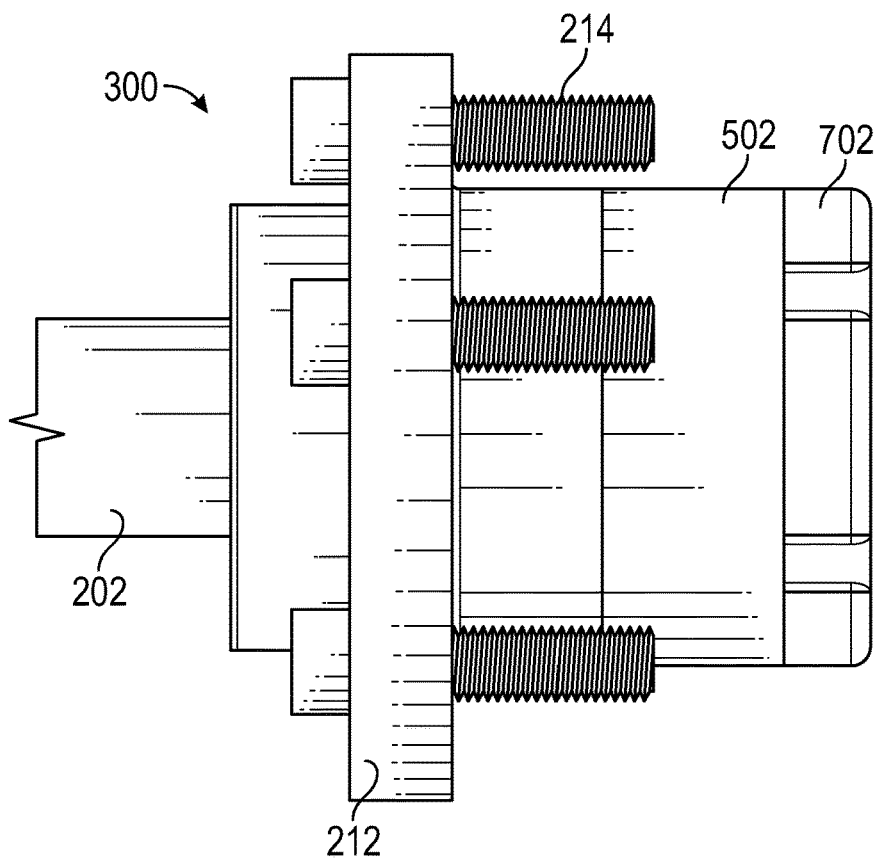
FIG. 9 shows a side elevational view of an assembled locking hub system in accordance with the present disclosure.

FIG. 8 shows a wheel 110 mounted on an assembled locking hub system 300 by fastening the wheel 110 to bolts 214 extending in an outward direction from the hub 212. The security lock 720 is accessible from the exterior of the dial 702 and thus from the exterior of the vehicle 100 for the purpose of locking and unlocking the hub 212, as needed for security. FIG. 9 illustrates a side view of an assembled locking hub system 300 rotatably coupled to an axle 202 of a vehicle 100.

FIG. 10 illustrates a cross-sectional view of the assembled locking hub system 300 rotatably coupled to an axle 202 as shown in FIG. 9. The system shown in FIG. 10 is in the locked configuration in which the locking ring 410 is mated with the splines 236 of the nut 230. In addition, the lock 720 is unlocked such that the dial 702 may be rotated to actuate the locking ring 410, as indicated by the position of the lock pawls 712. In FIG. 11, the dial 702 has been rotated to move the locking ring 410 into the unlocked configuration in which the locking ring 410 is decoupled from the splines 236 of the nut 230. When the dial 702 is rotated, the entire cap assembly 700 rotates, including the lock pawls 712. In FIG. 11, the cross-sectional plane is rotated from the plane as shown in FIG. 10 to remain in the same plane as the rotated lock pawls in order to illustrate the positioning of the pawls 712. As shown in FIG. 11, the lock 720 is locked such that the dial 702 may not rotate, as indicated by the position of the lock pawls 712. Thus, the hub 212 shown in FIG. 11 may freely rotate on bearings 208 and 220.

In an alternative embodiment, the system may have a locking security cover that completely covers the dial 702 or other type of actuator such that the locking ring 410 may not be actuated by an unauthorized user. In this embodiment, the security lock may be configured to selectively limit rotational movement of the dial by locking the security cover in a position in which the cover prevents operation of the dial.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed is:

1. A locking hub system comprising:
a wheel hub;
an axle having a threaded section having helical threads;
a threaded fastener having helical threads that are compatible with the threads on the axle, wherein the fastener is configured to fasten the wheel hub to the axle such that the wheel hub is rotatably coupled to the axle, wherein the fastener additionally has a plurality of splines;
a locking ring configured to mate with the splines of the fastener in a locked configuration and to decouple from the splines in an unlocked configuration, wherein the hub is locked in a rotationally fixed position in the locked configuration and free to rotate in the unlocked configuration;
an actuator operably connected to the locking ring and configured to move the locking ring in an axial direction between the locked configuration and the unlocked configuration; and
a lock configured to selectively limit operation of the actuator.

2. The locking hub system of claim 1, wherein the fastener is a nut having female threads configured to mate with male threads on the axle.

3. The locking hub system of claim 2, wherein the nut has opposing openings, wherein the system further comprises a pin sized for insertion through the opposing openings and through a hole extending through the axle when the nut is threaded onto the axle.

4. The locking hub system of claim 2, wherein the nut is a blind nut having an extension extending outwardly in an axial direction from a closed end of the nut opposite the female threads, wherein the splines are positioned externally around a circumference of the extension.

5. The locking hub system of claim 1, wherein the actuator is a mechanical actuator comprising a dial operably connected to the locking ring and configured to move the locking ring in an axial direction between the locked configuration and the unlocked configuration in response to rotational movement of the dial.

6. The locking hub system of claim 5, wherein the lock is configured to selectively limit rotational movement of the dial.

7. The locking hub system of claim 5, wherein the dial is secured to a housing that is fastened to the wheel hub with bolts, wherein the dial is configured to cover a head of each bolt when the locking ring is in the locked configuration.

8. The locking hub system of claim 7, wherein each bolt has a tamper-proof head.

9. The locking hub system of claim 5, wherein the dial is operably connected to the locking ring by a cam that moves in an axial direction between the locked configuration and the unlocked configuration in response to rotational movement of the dial.

10. The locking hub system of claim 5, wherein the locking ring is biased in an inward axial direction by a compression spring disposed between the dial and the locking ring.

11. The locking hub system of claim 1, wherein the locking ring has internal splines configured to mate with the splines of the fastener.

12. A locking hub system comprising:
a wheel hub;
an axle having a threaded section having helical threads;
a threaded fastener having helical threads that are compatible with the threads on the axle, wherein the fastener is configured to fasten the wheel hub to the axle such that the wheel hub is rotatably coupled to the axle, wherein the fastener additionally has a plurality of splines;

a locking ring having internal splines configured to mate with the splines of the fastener in a locked configuration and to decouple from the splines of the fastener in an unlocked configuration, wherein the hub is locked in a rotationally fixed position in the locked configuration and free to rotate in the unlocked configuration; and a cap assembly comprising a keyed lock, a lock pawl, and a dial that is operably connected to the locking ring and configured to move the locking ring in an axial direction between the locked configuration and the unlocked configuration in response to rotational movement of the dial, and wherein the pawl is configured to lock the dial in a rotationally fixed position in response to input from a key configured to operate the lock.

13. The locking hub system of claim 12, wherein the fastener is a nut having female threads configured to mate with male threads on the axle.

14. The locking hub system of claim 13, wherein the nut has opposing openings, wherein the system further comprises a pin sized for insertion through the opposing openings and through a hole extending through the axle when the nut is threaded onto the axle.

15. The locking hub system of claim 13, wherein the nut is a blind nut having an extension extending outwardly in an axial direction from a closed end of the nut opposite the female threads, wherein the splines are positioned externally around a circumference of the extension.

16. The locking hub system of claim 12, wherein the cap assembly is secured to a housing that is fastened to the wheel hub with bolts, wherein the dial is configured to cover a head of each bolt when the locking ring is in the locked configuration.

17. The locking hub system of claim 16, wherein each bolt has a tamper-proof head.

18. The locking hub system of claim 12, wherein the dial is operably connected to the locking ring by a cam that moves in an axial direction between the locked configuration and the unlocked configuration in response to rotational movement of the dial.

19. The locking hub system of claim 12, wherein the locking ring is biased in an inward axial direction by a compression spring disposed between the dial and the locking ring.

* * * * *